(12) United States Patent
Van Dijk

(10) Patent No.: US 7,658,399 B2
(45) Date of Patent: Feb. 9, 2010

(54) STROLLER

(75) Inventor: John Gert Til Van Dijk, SK Helmond (NL)

(73) Assignee: Cosco Management, Inc., Wilmington, DE (US)

( * ) Notice: Subject to any disclaimer, the term of this patent is extended or adjusted under 35 U.S.C. 154(b) by 351 days.

(21) Appl. No.: 11/708,543

(22) Filed: Feb. 21, 2007

(65) Prior Publication Data
US 2007/0194545 A1 Aug. 23, 2007

(30) Foreign Application Priority Data
Feb. 22, 2006 (NL) ................................. 1031213

(51) Int. Cl.
*B62B 9/00* (2006.01)
*B62B 7/00* (2006.01)
(52) U.S. Cl. ........................ 280/642; 280/30; 280/31; 280/47.4; 280/639; 280/654; 280/641; 280/33.993; 280/648; 280/650; 280/87.051; 280/47.25; 280/47.38; 280/47.41; 297/256.16; 297/354.1; 297/183.2
(58) Field of Classification Search ................. 280/31, 280/30, 47.4, 654, 639, 641, 7.16, 220, 226.1, 280/33.993, 642, 643, 647, 648, 650, 657, 280/658, 87.051, 47.25, 47.38, 47.41; 297/256.16, 297/354.12, 354.1, 256.17, 256.15, 183.4, 297/183.3, 183.2, 377, 16.2
See application file for complete search history.

(56) References Cited

U.S. PATENT DOCUMENTS

| 5,676,386 | A | * | 10/1997 | Huang ........................ 280/30 |
|---|---|---|---|---|
| 5,772,279 | A | * | 6/1998 | Johnson, Jr. ................ 297/130 |
| 5,794,951 | A | * | 8/1998 | Corley et al. ................ 280/30 |
| 5,947,555 | A | * | 9/1999 | Welsh et al. ................ 297/130 |
| 6,286,844 | B1 | * | 9/2001 | Cone et al. ................ 280/47.41 |
| 6,398,233 | B1 | * | 6/2002 | Liang et al. ................ 280/30 |
| 6,409,205 | B1 | * | 6/2002 | Bapst et al. ................ 280/642 |
| 6,513,827 | B1 | * | 2/2003 | Barenbrug ................ 280/648 |
| 6,530,591 | B2 | * | 3/2003 | Huang ........................ 280/650 |
| 6,641,164 | B2 | * | 11/2003 | Wood et al. ................ 280/648 |
| 6,702,316 | B2 | * | 3/2004 | Hsia ........................... 280/648 |
| 6,793,280 | B2 | * | 9/2004 | Washizuka et al. .......... 297/130 |
| 6,802,514 | B2 | * | 10/2004 | Worth et al. ................ 280/30 |
| 6,863,286 | B2 | * | 3/2005 | Eros et al. ................ 280/47.38 |
| 6,923,467 | B2 | * | 8/2005 | Hsia ........................... 280/648 |
| 6,983,986 | B2 | * | 1/2006 | Santamaria ................ 297/130 |

(Continued)

FOREIGN PATENT DOCUMENTS

DE   2005 008 211 U1   11/2005

(Continued)

*Primary Examiner*—Glenn Dayoan
*Assistant Examiner*—Jacob Meyer
(74) *Attorney, Agent, or Firm*—Barnes & Thornburg LLP

(57) ABSTRACT

A stroller includes at least one adapter, by which a first child seat is configured to be detachably connected to the stroller. The stroller further includes at least one connecting piece, by which a second child seat is configured to be detachably connected to the stroller. The at least one adapter is movable from at least a first position, in which the first child seat is configured to be detachably connected to the adapter, to at least a second position connected to the stroller, in which the second child seat is configured to be detachably connected to the connecting piece.

6 Claims, 7 Drawing Sheets

U.S. PATENT DOCUMENTS

| | | | |
|---|---|---|---|
| 6,986,518 B1* | 1/2006 | Besaw | 280/30 |
| 7,017,921 B2* | 3/2006 | Eros | 280/47.38 |
| 7,032,922 B1* | 4/2006 | Lan | 280/648 |
| 7,070,197 B2* | 7/2006 | Chen | 280/642 |
| 7,370,913 B2* | 5/2008 | Takamizu et al. | 297/256.16 |
| 7,377,537 B2* | 5/2008 | Li | 280/650 |
| 7,475,900 B2* | 1/2009 | Cheng | 280/642 |
| 2002/0093177 A1* | 7/2002 | Chen | 280/647 |
| 2002/0109320 A1* | 8/2002 | Wood et al. | 280/47.38 |
| 2003/0075903 A1* | 4/2003 | Hsia | 280/648 |
| 2003/0111825 A1* | 6/2003 | Lo et al. | 280/642 |
| 2004/0032103 A1* | 2/2004 | Hsia | 280/47.38 |
| 2004/0094922 A1* | 5/2004 | Eros | 280/47.38 |
| 2004/0124610 A1* | 7/2004 | Hou et al. | 280/642 |
| 2004/0245747 A1* | 12/2004 | Hsia | 280/642 |
| 2005/0242535 A1* | 11/2005 | Chen | 280/47.38 |
| 2005/0242549 A1* | 11/2005 | Longenecker et al. | 280/642 |
| 2006/0119079 A1* | 6/2006 | Yoshie et al. | 280/648 |
| 2007/0001429 A1* | 1/2007 | Maciejczyk | 280/642 |
| 2009/0127827 A1* | 5/2009 | Pike et al. | 280/648 |

FOREIGN PATENT DOCUMENTS

| | | |
|---|---|---|
| EP | 0 982 181 A2 | 3/2000 |
| EP | 1591 339 A2 | 11/2005 |

* cited by examiner

STROLLER

This is an application claiming priority to and benefit of The Netherlands Application No. 1031213, filed on Feb. 22, 2006, the subject matter of which is expressly incorporated by reference herein.

BACKGROUND AND SUMMARY

The present disclosure relates to a stroller provided with at least one adapter, by which a first child seat can be detachably connected to the stroller. The stroller is furthermore provided with at least one connecting piece, by which a second child seat can be detachably connected to the stroller. The adapter is movable from at least a first position, in which the first child seat can be detachably connected to the adapter, to at least a second position connected to the stroller, in which the second child seat can be detachably connected to the connecting piece, and vice versa.

The term child seat, as used in the present disclosure, is understood to mean, inter alia, a chair or a bed in which a child can be transported in a seated and/or a recumbent position.

With such a stroller, which is known from U.S. Pat. No. 7,032,922 B1, the vertical position of the adapter relative to the stroller in the first position of the adapter is different from the vertical position of the connecting piece in the second position of the adapter.

This makes it possible to position the child seat in a first or a second vertical position in the stroller, depending on the type of child seat in question.

The spacing between two opposite adapters in the first position is the same as the spacing between the connecting pieces in the second position of the adapters. However, the stroller is unsuitable for connecting child seats of different widths thereto.

The present disclosure relates to a stroller wherein child seats of different widths can be connected to the stroller.

The stroller, according to the present disclosure, is provided with at least two adapters as well as with two connecting pieces, wherein the spacing between the adapters in the first position is different from the spacing between the connecting pieces in the second position of the adapters.

Since each adapter is connected to the stroller and is movable with respect to the stroller from at least a first position to at least a second position, each adapter is available for use on the stroller at all times. The stroller is adapted for receiving the first child seat and the second child seat, respectively, by moving the adapter from one position to the other position.

Child seats, such as plastic buckets suitable for transporting babies up to about 9 months of age, are comparatively narrow. The spacing between the adapters must be relatively small in such a case in order to be able to realize a connection with child seats of this type.

Child seats, such as carrycots or seats for infants up to 1-4 years of age, on the other hand, are comparatively wide. The spacing between the connecting pieces must be comparatively large in such a case in order to be able to connect child seats of this type to the stroller as well. The spacing between the adapters will, in such a case, be smaller than the spacing between the connecting pieces.

It is also possible to connect the buckets to the connecting pieces and to connect the carrycot to the adapters, in which case the spacing between the connecting pieces must be smaller than the spacing between the adapters.

It is noted that the frame of a stroller that is known from European patent application EP-A2-0 982 181 is provided with connecting pieces positioned opposite each other, to which a child seat can be connected. The child seat can be detached from the connecting pieces, after which an adapter can be connected to the connecting pieces. Subsequently another child seat can be connected to the adapter.

In this way, the stroller is suitable for use with two different child seats.

If a child seat is to be connected to the connecting pieces, the adapter must be removed from the stroller and be stored separately. A drawback of this is that if the user forgets to take the adapter along, the child seat that is to be connected to the adapter cannot be connected to the stroller.

An embodiment of a stroller, according to the present disclosure, includes a connection between the first child seat and the adapter that is different from a connection between the second child seat and the connecting piece.

Different types and/or brands of child seats frequently have different types of means via which they can be connected to strollers. The stroller is generally adapted for transporting the various types and/or brands of child seats by adapting the adapter and the connecting piece for use with different types of child seats.

Yet another embodiment of a stroller, according to the present disclosure, includes an adapter that is provided with a connecting piece. The adapter will, in such a case, be suitable for connection to the first child seat on a first side and for connection to a second child seat on the other side, which is provided with the connecting piece.

Yet another embodiment of a stroller, according to the present disclosure, includes an adapter that can be translated from a first position to a second position, and vice versa, with respect to the stroller.

A spacing between the adapters can be adjusted by translating two adapters, for example, in which the spacing between the adapters is comparatively large in a first position, for example, while the spacing between the adapters is comparatively small in the second position. When, according to the present disclosure, the adapters are provided with the connecting pieces, the child seats can be connected to the connecting pieces both in the first and in the second position of the adapters, and thus of the connecting pieces. However, the spacing between the adapters, and thus the connecting pieces, is different.

Yet another embodiment of a stroller, according to the present disclosure, includes an adapter that is pivotable about a pivot axis from the first position to the second position, and vice versa, with respect to the stroller.

Pivoting the adapter is comparatively easy. The pivot axis extends parallel or transversely to a direction of motion of the stroller. A user will find such a way of pivoting to be comparatively easy and logical.

Yet another embodiment of a stroller, according to the present disclosure, includes an adapter that can be locked in at least the first or the second position.

In such an embodiment as just described, the adapter cannot undesirably move out of a particular position.

Other aspects of the present disclosure will become apparent from the following descriptions when considered in conjunction with the accompanying drawings.

DETAILED DESCRIPTION

It is noted that like parts are indicated by the same numerals in the Figures.

Figure 1:
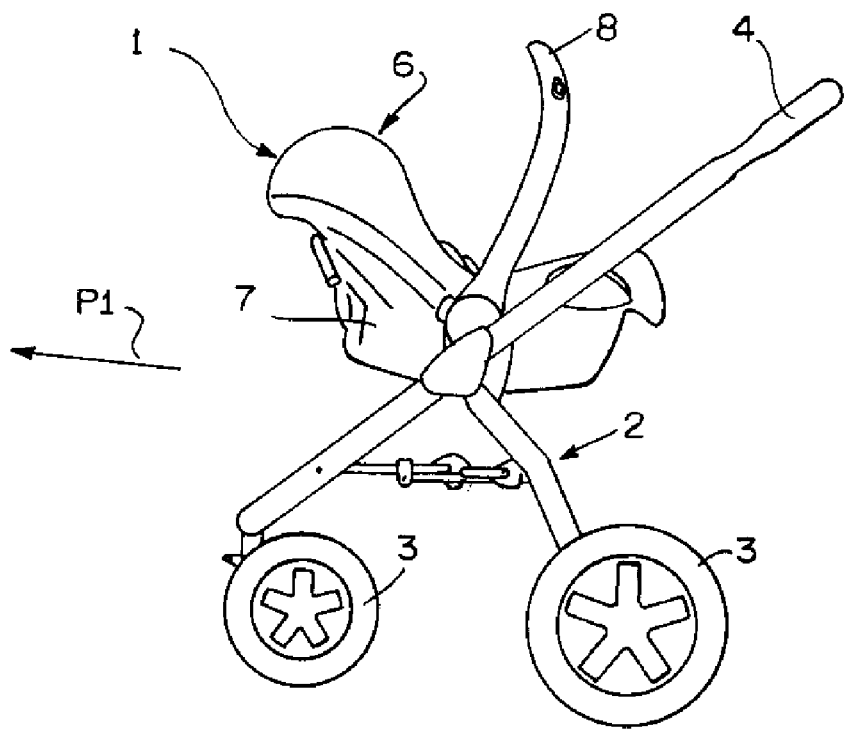
FIG. 1 is a side view of a stroller, according to the present disclosure, which stroller is provided with a first child seat.
Figure 2:
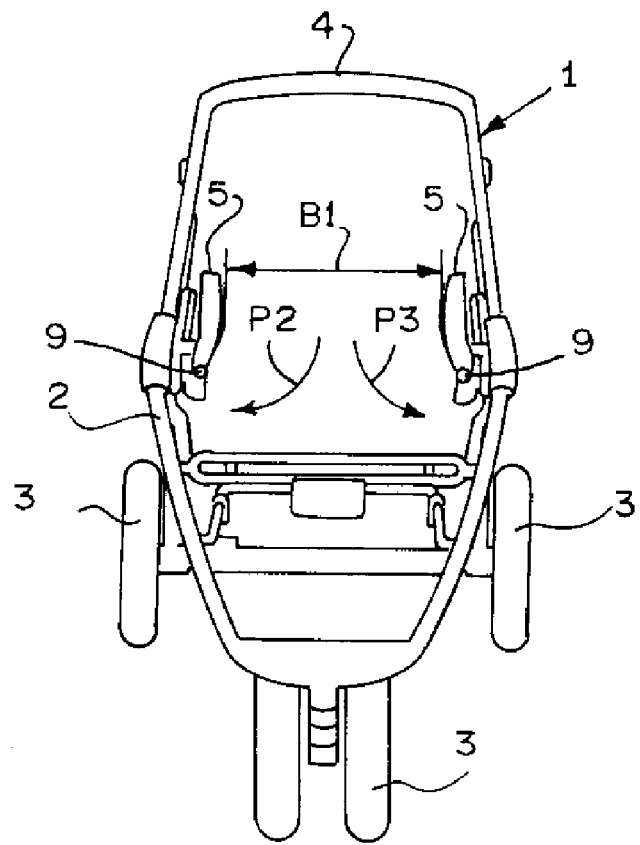
FIG. 2 is a front view of the stroller of FIG. 1, without the first child seat.

FIG. 1 shows a stroller 1, according to the present disclosure, which is provided with a collapsible frame 2 comprising a number of wheels 3 as well as a push bar 4 by which the stroller is configured to be moved in a direction of transport as indicated by the arrow P1. The stroller 1 is provided with two adapters 5, which are connected to the frame 2 on either side thereof. As shown in FIG. 1 and FIG. 2, the adapters 5 take up a first position. A spacing between the adapters 5 positioned on either side of the frame 2 equals B1. The stroller 1 is furthermore provided with a first child seat 6. Child seat 6 comprises a plastic bucket 7 and a carrying bracket 8 that is pivotally connected to bucket 7. The child seat 6 is known and will not be explained in more detail herein. The child seat 6 is provided with means for connection to the adapters 5. Such means are likewise known and will not be explained in more detail herein. The child seat 6 is detachably connected to the stroller 1 by connecting the aforementioned means of the child seat 6 to the adapter 5, thereby making it possible to transport the child seat 6 by the stroller 1. If a user wishes to use the child seat 6 separately from the stroller 1, for example in order to transport it in a vehicle, the child seat 6 is disconnected from the adapters 5.

Figures 3, 4:
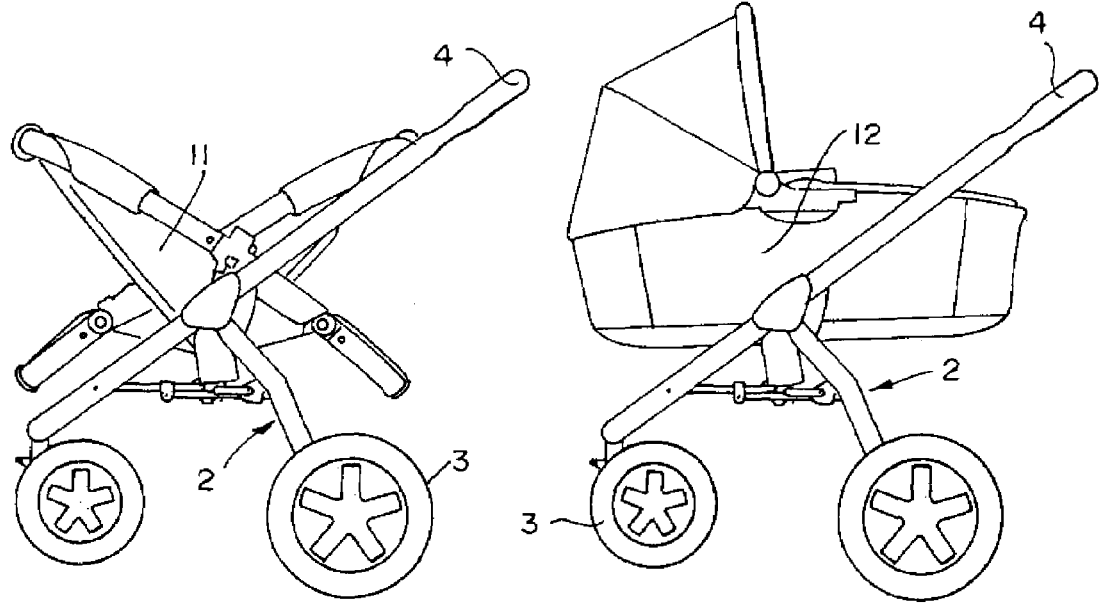
FIG. 3 is a side view of the stroller of FIG. 2, which stroller includes a first embodiment of a second child seat.
FIG. 4 is a side view of the stroller of FIG. 2, which stroller includes a second embodiment of a second child seat.
Figure 5:
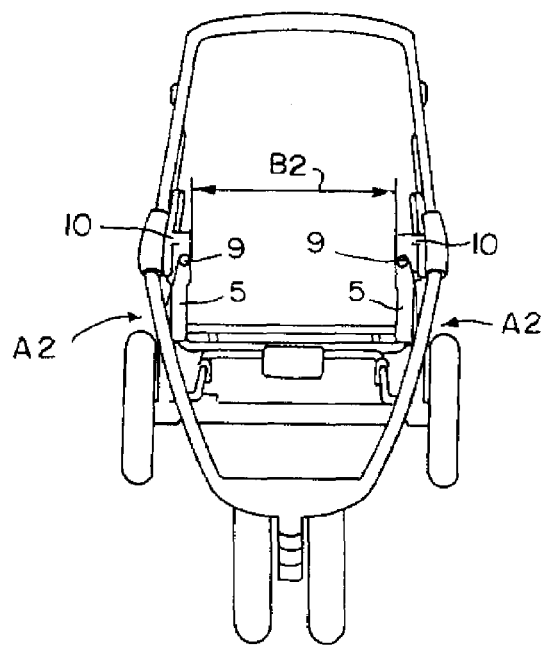
FIG. 5 is a front view of the stroller of FIGS. 3 and 4, without either child seat.

The adapters 5 are pivotable with respect to the frame 2 about pivot axes 9 that extend parallel to a direction of transport, as indicated by the arrow P1. By pivoting the adapters 5 about the pivot axes 9 in the directions indicated by the arrows P2 and P3, respectively, the adapters 5 are moved from a first position A1 to a second position A2, as shown in FIG. 5. In this second position A2, connecting pieces 10, that are connected to the frame 2, are accessible, which connecting pieces 10 are spaced a distance B2 apart. A child seat 11, as shown in FIG. 3, or a carrycot 12, as shown in FIG. 4, can be connected to the connecting pieces 10. The child seat 11, which is suitable for children of for example 1-4 years of age, is provided with means that can be connected to the connecting pieces 10. The carrycot 12 is provided with similar means.

Since the adapters 5 have been moved to the second position A2, as shown in FIG. 5, the adapters 5 do not form an impediment when connecting the child seat 11 or the carrycot 12 to the connecting pieces 10.

The means by which the child seat 6 is connected to the adapters 5 may be the same as the means by which the child seat 11 or the carrycot 12 is connected to the connecting pieces 10. In such a case, only the spacing between the adapters 5 or the connecting pieces 10 is changed from B1 to B2 by pivoting the adapters 5 from the first position A1, as shown in FIG. 2, to the second position A2, as shown in FIG. 5.

The means by which the child seat 6 is connected to the adapters 5 may be different from the means by which the child seat 11 or the carrycot 12 is connected to the connecting pieces 10. In such a case, not only the spacing is changed from B1 to B2 by moving the adapters 5 from the first position A1 to the second position A2, but also a manner of connection is changed.

Figure 6A:
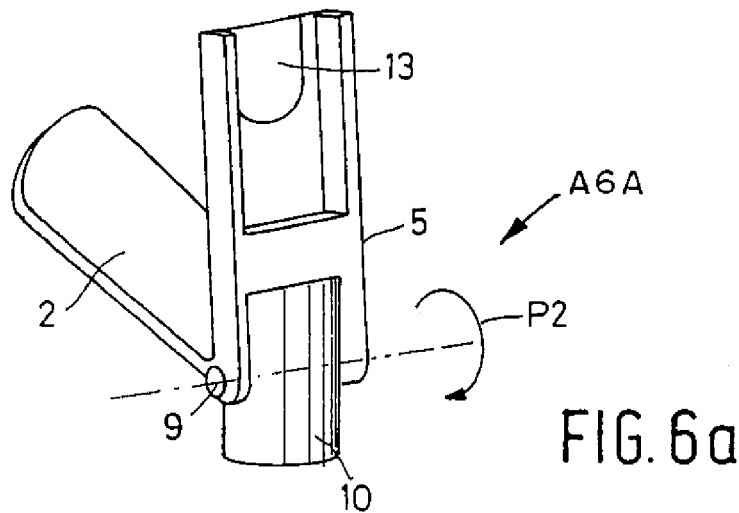
FIGS. 6a-6c are perspective views of a first embodiment of a part of a stroller, according to the present disclosure, showing an adapter, in which the adapter is shown in different positions.
Figure 6B:
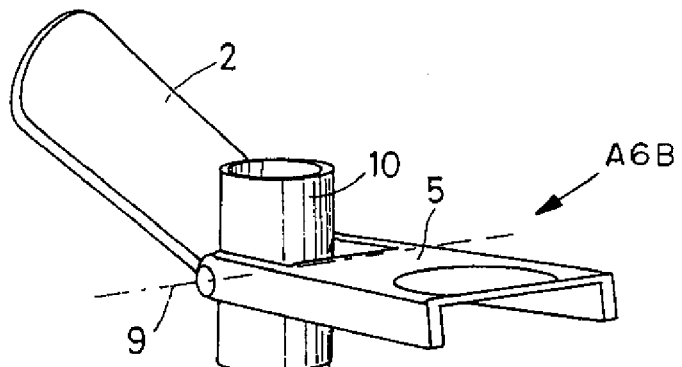
Figure 6C:
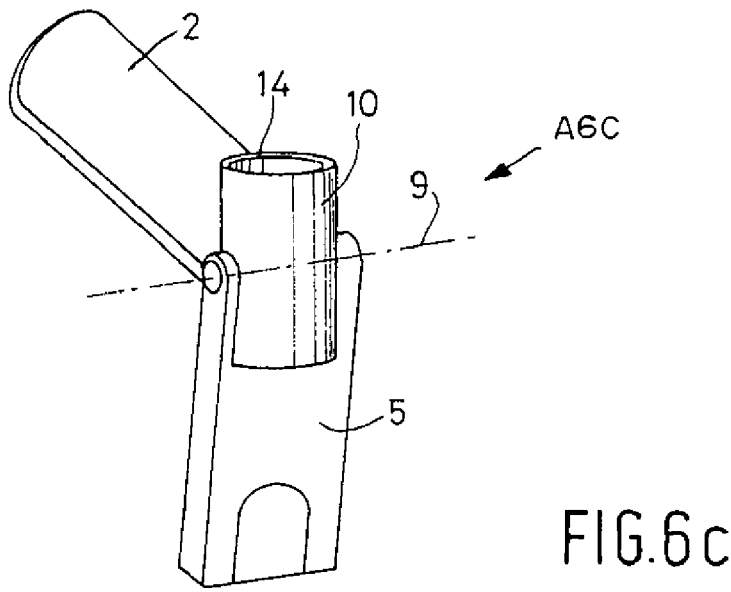

FIGS. 6a-6c are views of the adapters 5 shown in FIG. 2 and FIG. 5. The adapters 5 arc pivotally connected to the frame 2 about a pivot axis 9. The adapter 5 is provided with a slot 13 on a side remote from the pivot axis 9, into which slot 13 a plate-shaped element connected to a child seat can be slid and be positioned therein (not shown).

If the adapter 5 is not needed anymore, the adapter in 5 is pivoted from a first position A6A about the pivot axis 9 in the direction indicated by the arrow P2, via an intermediate position A6B, as shown in FIG. 6b, to a second position A6C, as shown in FIG. 6c. In this second position A6C, connecting piece 10 connected to the frame 2 is accessible. The connecting piece 10 comprises a circular cylindrical passage 14, into which passageway 14 a pin connected to a child seat can be slid and be positioned therein (not shown).

In the position of the pivot axes 9 as shown in FIG. 2 and FIG. 5, the spacing B1 between the adapters 5 is increased to the spacing B2 between the connecting pieces 10 by pivoting the adapters 5 about the pivot axes 9.

Figure 7A:
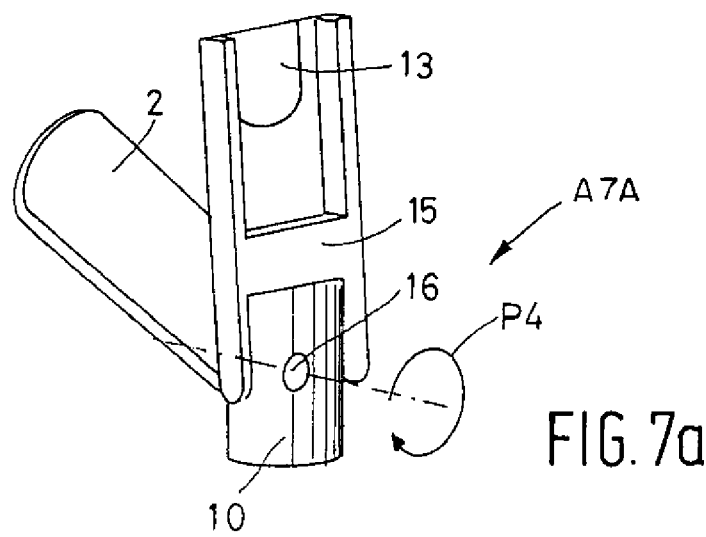
FIGS. 7a-7c are perspective views of a second embodiment of a part of a stroller, according to the present disclosure showing an adapter, in which the adapter is shown in different positions.
Figure 7B:
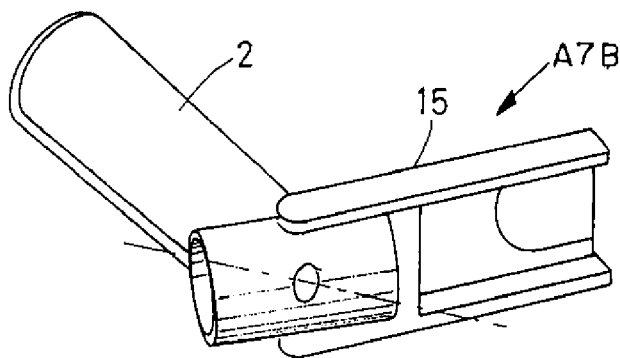
Figure 7C:
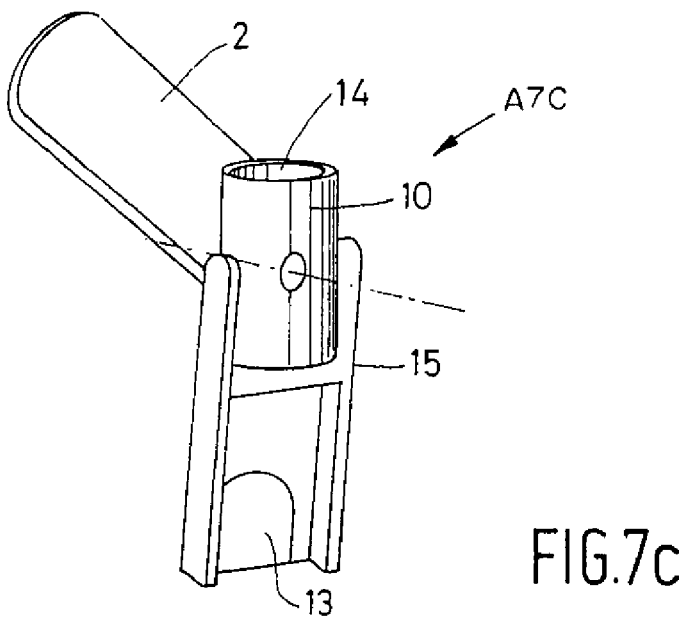

FIGS. 7a-7c show a second embodiment of an adapter 15, which adapter 15 is provided with a slot 13 on one side and with a connecting piece 10, which connecting piece 10 comprises a circular cylindrical passage 14 on a side remote from the slot 13. The adapter 15 is pivotable about a pivot axis 16 that extends horizontally and transversely to the direction of transport indicated by the arrow P1 in FIG. 1. In a first position A7A of the adapter 15, as shown in FIG. 7a, a child seat provided with an element that mates with the slot 13 can be connected to the adapter 15 (not shown).

If another type of child seat is to be connected to the adapter 15, the adapter 15 is pivoted in a direction, indicated by the arrow P4, via an intermediate position A7B, as shown in FIG. 7b, to a second position A7C, as shown in FIG. 7c. In this second position A7C, a pin connected to another child seat can be inserted into the circular cylindrical passage 14 of the connecting piece 10 so as to connect the child seat to the adapter 15 (not shown).

Figure 8A:
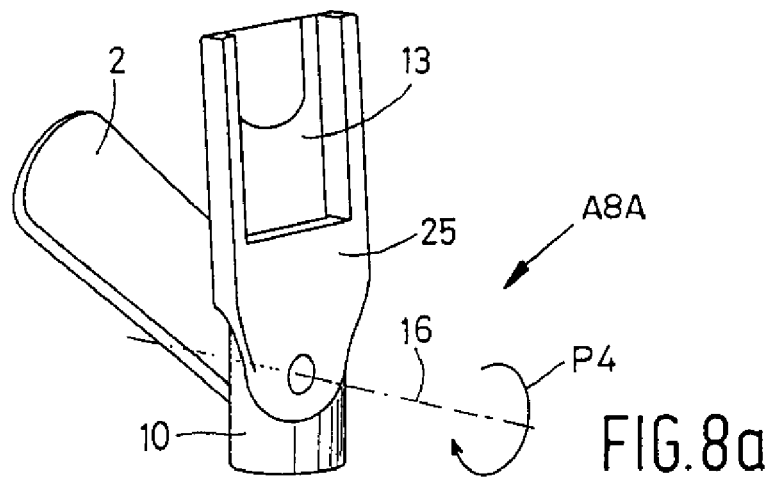
FIGS. 8a-8c are perspective views of a third embodiment of a part of a stroller, according to the present disclosure, showing an adapter, in which the adapter is shown in different positions.
Figure 8B:
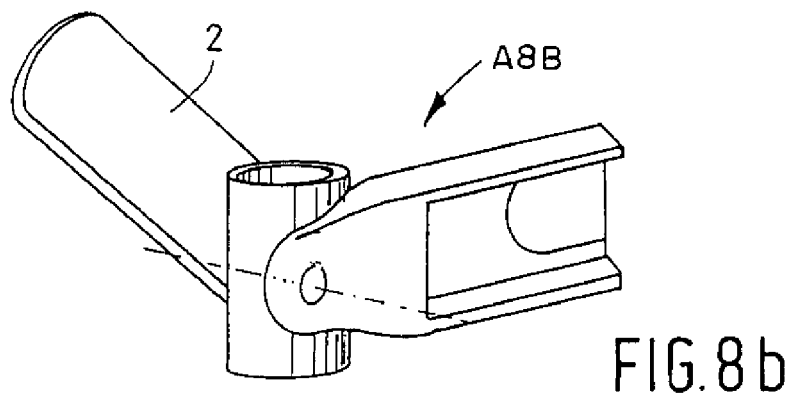
Figure 8C:
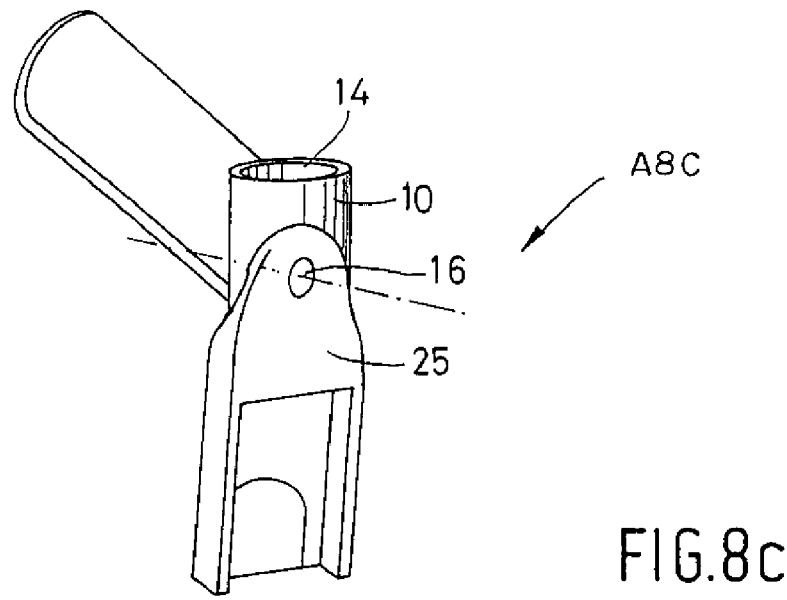

FIGS. 8a-8c show a third embodiment of an adapter 25, which is provided with a slot 13. The adapter 25 is pivotable about pivot axis 16 that extends transversely to the direction indicated by the arrow P1, as shown in FIG. 1. The slot 13 is accessible in a first position A8A of the adapter 25, that is shown in FIG. 8a. A connecting piece 10 that is connected to the frame 2 becomes accessible after pivoting of the adapter 25 in the direction indicated by the arrow P4, via an intermediate position A8B, as shown in FIG. 8b, to a second position A8C as shown in FIG. 8c. The connecting piece 10 is provided with a circular cylindrical passage 14.

Figure 9A:
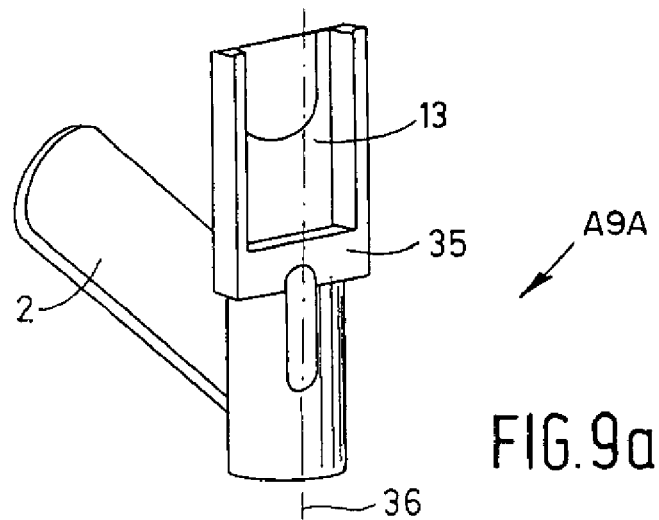
FIGS. 9a-9c are perspective views of a fourth embodiment or a part of a stroller, according to the present disclosure, showing an adapter, in which the adapter is shown in different positions.
Figure 9B:
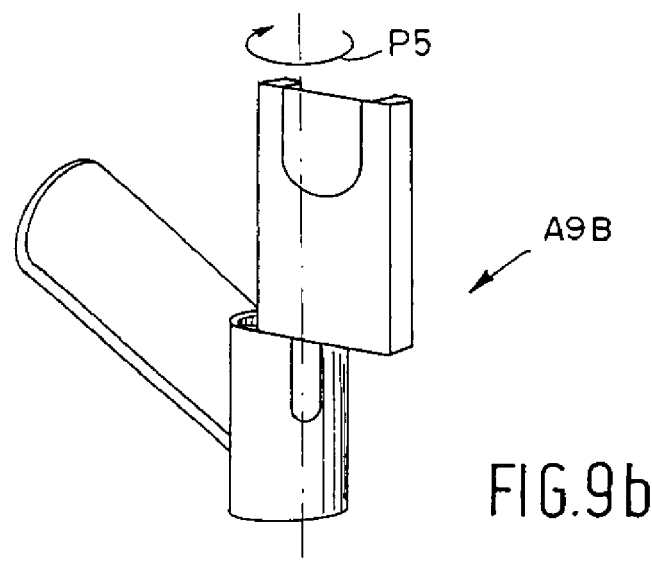
Figure 9C:
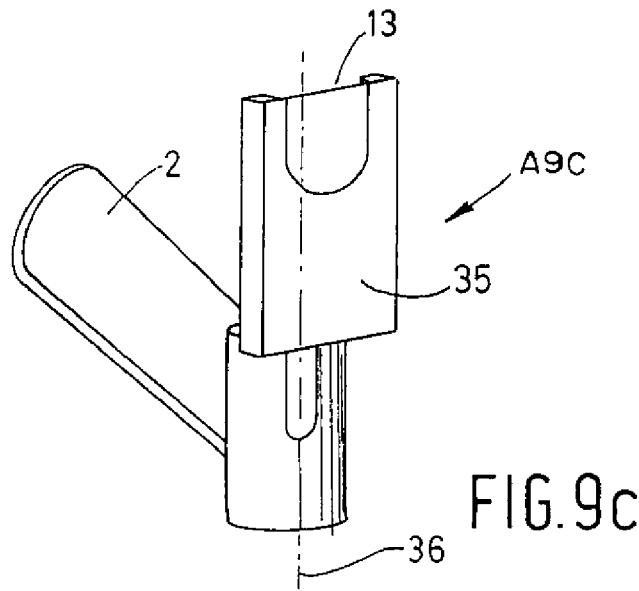

FIGS. 9a-9c show a fourth embodiment of an adapter 35, according to the present disclosure, which adapter 35 is provided with a slot 13. The adapter 35 is pivotable about a pivot axis, 36 that extends vertically with respect to the frame 2, from a first position A9A, as shown in FIG. 9*a*, via an intermediate position A9B, as shown in FIG. 9*b*, to a second position A9C, as shown in FIG. 9*c*. In this second position A9C, access to the slot 13 is possible in a different manner than in the first position A9A, as shown in FIG. 9*a*. This makes it possible to connect a child seat to the adapter 35 in a different manner (not shown).

Figure 10A:
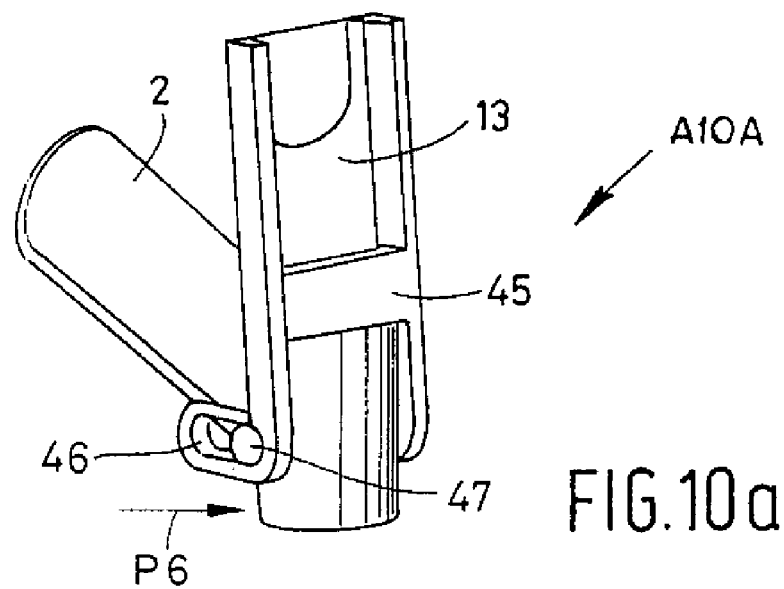
FIGS. 10a-10b are perspective views of a fifth embodiment of a part of a stroller, according to the present disclosure, showing an adapter in different positions.
Figure 10B:
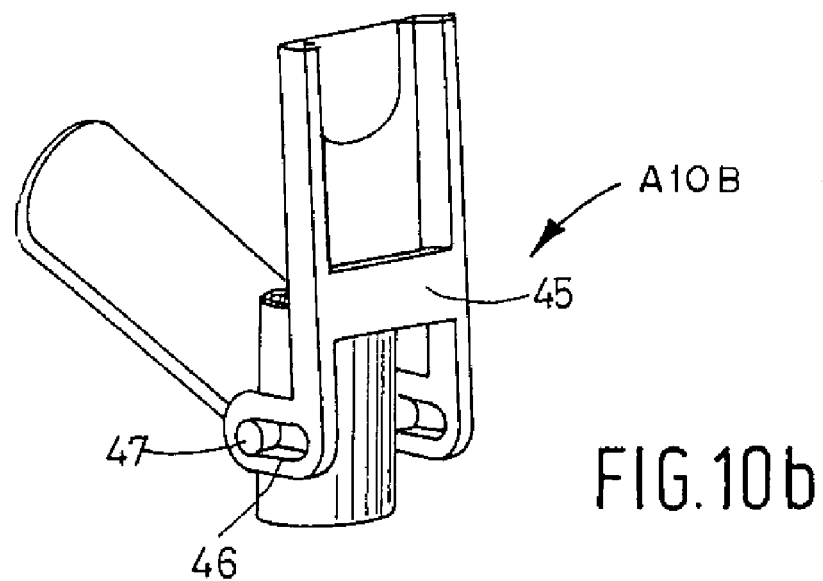

FIGS. 10*a* and 10*b* show a fifth embodiment of an adapter 45, according to the present disclosure, which adapter 45 is provided with a slot 13. In this embodiment, the slot 13 forms a connecting piece 10 that is connected to the adapter 45. The adapter 45 is provided with two elongated openings 46 present on either side of the slot 13. A pin 47, connected to the frame 2, extends through the openings 46. The adapter 45 is movable in a direction indicated by the arrow P6, from a first position A10A, as shown in FIG. 10*a*, to a second position A10B, as shown in FIG. 10*b*. If the stroller 1 is provided with two adapters 45 positioned opposite each other, a spacing between the adapters is reduced by moving the adapters 45 in a direction indicated by the arrow P6. The manner of connection to child seats may be the same as in one or more of the other embodiments.

It is within the scope of the present disclosure to provide adapters with a number of different types of connecting pieces. Such adapters can be positioned in a number of different positions, in each of which positions a different connecting piece is accessible for connection to an associated child seat. If the adapter is provided with three or four different types of connecting pieces, for example, the adapter is suitable for connecting at least three to four different types of child seats to the stroller.

It is within the scope of the present disclosure to connect an element other than a child seat, for example, a shopping basket, to one or more of the adapters and/or the connecting pieces, so that the stroller 1 can be used for shopping.

In the embodiment shown in FIG. 1 and FIG. 3, a child that is present in the child seat faces a person who pushes the stroller 1. It is within the scope of the present disclosure to mount the child seat in a reverse position, in which the child faces in the direction of motion P1.

Although the present disclosure has been described and illustrated in detail, it is to be clearly understood that this is done by way of illustration and example only and is not to be taken by way of limitation. The scope of the present disclosure is to be limited only by the terms of the appended claims.

The invention claimed is:

1. A stroller comprising:
   two adapters for detachably connecting a first child seat in a use position to the stroller;
   two connecting pieces for detachably connecting a second child seat in a use position to the stroller;
   wherein the two adapters are pivotable from at least a first position in which the first child seat is detachably connectable to the two adapters to a second position coupled to the stroller, wherein in the second position of the adapters the connecting pieces are accessible such that the second child seat is detachably connectable to the connecting pieces, wherein in the first position the two adapters prevent usable access to the two connecting pieces thereby making the two connecting pieces inaccessible for connecting the second seat thereto in the use position; and
   a first spacing between the two adapters in the first position is different from a second spacing, between the connecting pieces in the second position.

2. The stroller according to claim 1, wherein the detachable connection between the first child seat and the two adapters is different from the detachable connection between the second child seat and the two connecting pieces.

3. The stroller according to claim 1, wherein the two adapters are each provided with one of the connecting pieces.

4. The stroller according to claim 1, wherein the two adapters are pivotable about a pivot axis from one or both of a) the first position to the second position with respect to the stroller and b) the second position to the first position with respect to the stroller.

5. The stroller according to claim 4, wherein the pivot axis extends one of a) parallel and b) transversely to a direction of motion of the stroller.

6. The stroller according to claim 1, wherein the two adapters are configured to be detachably locked in at least one of a) the first position and b) the second position.

* * * * *